Oct. 1, 1935.   A. ROSNER   2,015,763
MANUFACTURE OF BRAKE SHOES AND THE LIKE
Original Filed April 21, 1930   2 Sheets-Sheet 1

INVENTOR.
ADOLPH ROSNER
BY
ATTORNEY

Oct. 1, 1935.     A. ROSNER     2,015,763
MANUFACTURE OF BRAKE SHOES AND THE LIKE
Original Filed April 21, 1930    2 Sheets-Sheet 2
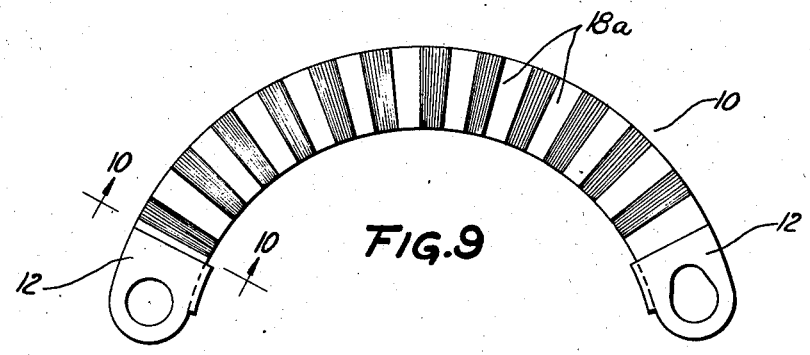
FIG.9
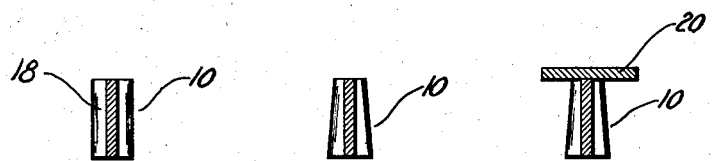 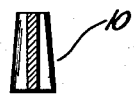 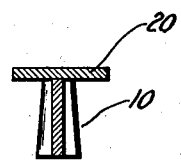
FIG.8    FIG.10    FIG.12
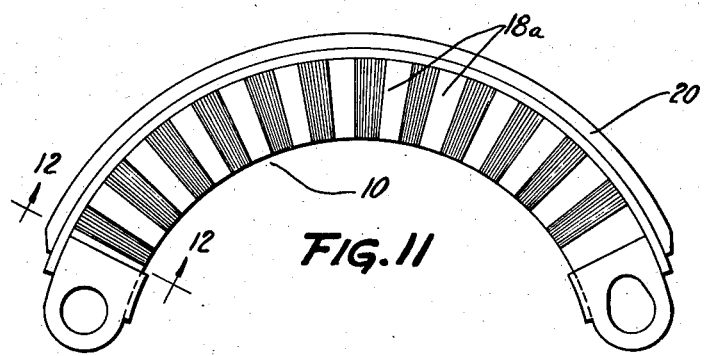
FIG.11
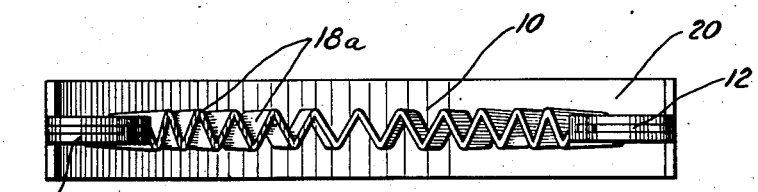
FIG.13
INVENTOR.
ADOLPH ROSNER
BY
*Jn.W.McConkey*
ATTORNEY Patented Oct. 1, 1935

2,015,763

UNITED STATES PATENT OFFICE 2,015,763

MANUFACTURE OF BRAKE SHOES AND THE LIKE

Adolph Rosner, Rockton, Ill., assignor, by mesne assignments, to Bendix Brake Company, South Bend, Ind., a corporation of Illinois Original application April 21, 1930, Serial No. 445,870. Divided and this application September 20, 1932, Serial No. 634,040

2 Claims. (Cl. 29—152.1)

This invention relates to the manufacture of articles such as the friction elements of brakes, and is illustrated as carried out in making a shoe for an internal expanding automobile brake.

An object is to provide a method of manufacturing a strong and rigid shoe or the like from relatively light sheet metal, usually sheet steel, this material being of course cheaper than the heavier material as well as having the advantage that the lighter shoe is preferable if equally strong. Another advantage of my method is that strip steel, which is cheaper than sheet steel of the same weight, may be used both for the web and the rim of the shoe.

Preferably I stamp a straight, flat web blank from the strip steel or other material, provide it with suitable end fittings and with any desired openings and the like, and then stamp in it a series of parallel transverse corrugations. The web blank so formed is then bent into an arc in the plane of the original material, i. e. widthwise of the blank, and a curved rim blank (which may also be formed from strip steel) is welded or otherwise secured to the edge of the web.

The above and other advantageous steps of the method, and novel details thereof, will be apparent from the following description of the illustrative sequence shown in the accompanying drawings, in which:

Figure 8 is a section through the blank at this stage, on the line 8—8 of Figure 6;

Figure 9 is a side elevation of the blank after bending;

Figure 10 is a section through the bent blank on the line 10—10 of Figure 9;

Figure 11 is a side elevation of the shoe after the attachment of the rim;

Figure 12 is a section on the line 12—12 of Figure 11; and

Figure 13 is a bottom plan view of the shoe.

Figure 1:
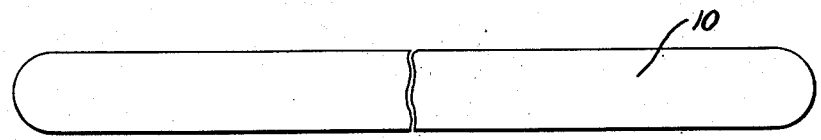
Figure 1 is a side elevation of the piece cut from the strip steel to form the web blank.
Figure 2:
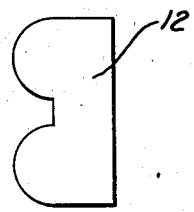
Figure 2 is a plan view of a stamping used in forming one of the end fittings.
Figure 3:
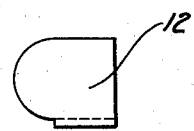
Figure 3 is a side elevation of the fitting.
Figure 4:
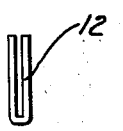
Figure 4 is an end elevation of the fitting.
Figure 5:
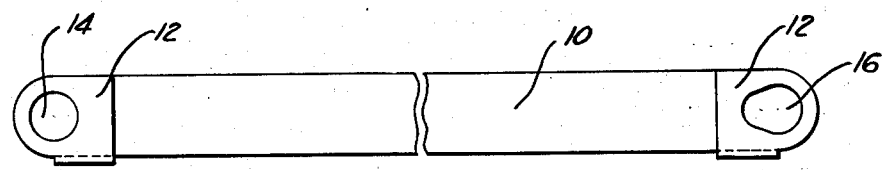
Figure 5 is a side elevation of the blank with the end fittings attached, and pierced at its ends to form openings, at one end for an anchor fitting and at the other end for a transverse pivot carrying a pair of cam rollers.

In making a brake shoe or the like according to my novel method, I preferably first stamp a straight web blank 10 from strip steel of the same width, forming the blank or element shown in plan in Figure 1. Another blank 12 shown in Figure 2 may be doubled upon itself as shown in Figures 3 and 4, one of these fittings being spot-welded or otherwise secured to each end of the blank 10 as shown in Figure 5. Openings 14 and 16 may then be pierced in the ends of the blank, through the fittings 12, to take care respectively of a pivot mounting having on its ends a pair of cam rollers (not shown), and an anchor connection (not shown).

Figure 6:
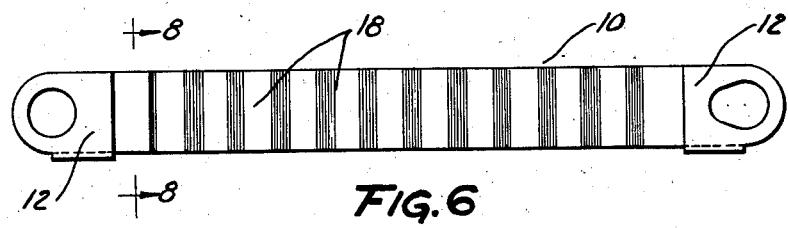
Figures 6 and 7 are respectively a side elevation and a bottom plan view of the blank after corrugating.
Figure 7:
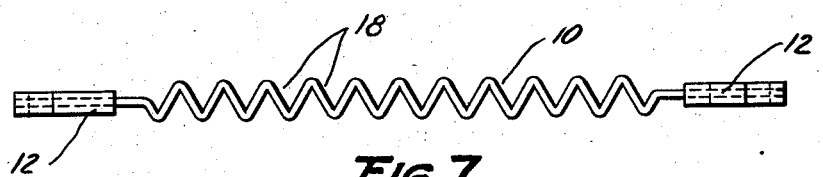

The blank is then pressed or stamped to form a series of transverse (i. e. widthwise-extending) parallel corrugations 18, as shown in Figures 6, 7, and 8. The block is then bent, in the plane of the original material (i. e. widthwise) to form an arc, as shown in Figures 9 and 10, the outer portions of the corrugations being stretched and flattened, and the inner portions being compressed and deepened, as will be apparent from a comparison of Figures 8 and 10.

A rim 20, cut from a strip of steel and bent into an arc corresponding to the curvature of the web, is now placed against the outer edge of the bent and corrugated web, and permanently secured thereto by spot welding or otherwise.

The shoe so formed shown in Figures 11, 12, and 13, is both light and strong, and the material from which it is made is considerably cheaper than heretofore used.

While one particular sequence of steps, and a particular structure, have been described in detail, it is not may intention to limit the scope of the invention thereto, or otherwise than by the terms of the appended claims. The present application is a division of my application No. 445,870, filed April 21, 1930.

I claim:

1. A method of producing a friction element comprising stamping a strip of metal, deforming the strip to a curve having a predetermined radius, stamping a second strip of metal, piercing apertures in the respective ends thereof, corrugating the second mentioned strip, deforming the second mentioned strip by stretching one edge thereof while compressing the other edge to decrease the undulations on one edge and to increase the undulations on the other edge, stamping reinforcing plates, bending the reinforcing plates upon themselves and fitting the reinforcing plates on the ends of the second strip and spot welding the corrugated strip to the first strip.

2. A method of forming a brake shoe or the like comprising the steps of forming a strip of metal with transverse corrugations, and bending the strip in the plane of the original material to form an arc approximating half a circumference in length with radial corrugations which are broadest at the outer edge of the strip and which converge as they approach the inner edge and welding a rim member directly to one of the edges of said strip.

ADOLPH ROSNER.